(12) United States Patent
LeBlanc et al.

(10) Patent No.: US 10,753,638 B2
(45) Date of Patent: Aug. 25, 2020

(54) VENTILATION PANEL WITH PANEL SILENCER FOR A TURBINE PACKAGE ENCLOSURE

(71) Applicant: Solar Turbines Incorporated, San Diego, CA (US)

(72) Inventors: Paul A. LeBlanc, Kaufman, TX (US); Richard Lee Boister, Athens, TX (US); John D. Connolly, II, Athens, TX (US)

(73) Assignee: Solar Turbines Incorporated, San Diego, CA (US)

( * ) Notice: Subject to any disclaimer, the term of this patent is extended or adjusted under 35 U.S.C. 154(b) by 850 days.

(21) Appl. No.: 15/377,830

(22) Filed: Dec. 13, 2016

(65) Prior Publication Data

US 2018/0163569 A1 Jun. 14, 2018

(51) Int. Cl.
| | |
|---|---|
| *F24F 13/18* | (2006.01) |
| *F02C 7/20* | (2006.01) |
| *F02C 7/25* | (2006.01) |
| *F24F 13/15* | (2006.01) |
| *F24F 13/14* | (2006.01) |

(Continued)

(52) U.S. Cl.
CPC ............... *F24F 13/18* (2013.01); *A62C 2/14* (2013.01); *A62C 37/38* (2013.01); *A62C 99/0018* (2013.01); *F02C 7/20* (2013.01); *F02C 7/25* (2013.01); *F24F 13/08* (2013.01); *F24F 13/1426* (2013.01); *F24F 13/15* (2013.01);

(Continued)

(58) Field of Classification Search
CPC ..... F02C 7/25; F02C 7/24; A62C 2/12; A62C 2/14; A62C 4/04; E06B 7/32; E06B 7/08; E06B 9/04

USPC .............. 454/369, 906, 257, 195, 306, 155, 454/275–283; 49/163, 169, 170, 501
See application file for complete search history.

(56) References Cited

U.S. PATENT DOCUMENTS

| | | | | |
|---|---|---|---|---|
| 1,650,598 A | * | 11/1927 | Brooks ..................... | E06B 7/32 49/5 |
| 3,330,379 A | * | 7/1967 | Loren ..................... | F24F 7/025 181/224 |

(Continued)

FOREIGN PATENT DOCUMENTS

| | | | | |
|---|---|---|---|---|
| CN | 102454436 A | | 5/2012 | |
| DE | 102005058920 A1 | * | 7/2006 | ............ E03F 5/0407 |

(Continued)

OTHER PUBLICATIONS

"Machine Translation of DE 102005058920 A1". 2020.*

*Primary Examiner* — Edelmira Bosques
*Assistant Examiner* — Christopher Matthew Odell
(74) *Attorney, Agent, or Firm* — Procopio, Cory, Hargreaves & Savitch LLP

(57) ABSTRACT

A ventilation panel for an enclosure of an industrial machine is disclosed herein. In embodiments, the ventilation panel includes a panel silencer and a fire damper assembly. The panel silencer includes a number of panels joined together to form an internal cavity and a front panel opening that provides access into the internal cavity. The fire damper assembly partially inserts into the panel silencer. The fire damper assembly includes a plurality of isolation louvers and an actuation assembly. The plurality of isolation louvers are rotatably affixed within the fire damper assembly. The actuation assembly rotates the plurality of isolation louvers into a closed position when activated.

20 Claims, 6 Drawing Sheets

(51) Int. Cl.
*F24F 13/08* (2006.01)
*A62C 99/00* (2010.01)
*A62C 37/38* (2006.01)
*A62C 2/14* (2006.01)
*E06B 5/16* (2006.01)
*F24F 13/24* (2006.01)

(52) U.S. Cl.
CPC ........ *E06B 5/162* (2013.01); *F05D 2260/608* (2013.01); *F24F 2013/242* (2013.01)

(56) References Cited

U.S. PATENT DOCUMENTS

| | | | | |
|---|---|---|---|---|
| 4,184,288 | A | * | 1/1980 | Magill ............... A62C 2/14 137/601.09 |
| 4,579,047 | A | * | 4/1986 | Zielinski ............ A62C 2/16 454/369 |
| 5,957,772 | A | * | 9/1999 | Rutkowski ......... A62C 2/14 454/257 |
| 6,579,169 | B1 | * | 6/2003 | Demark .............. E06B 7/02 454/200 |
| 6,962,057 | B2 | | 11/2005 | Kurokawa et al. |
| 9,066,449 | B2 | * | 6/2015 | Jun ................. H05K 7/20718 |
| 2004/0121722 | A1 | * | 6/2004 | Heil .................. F16K 17/386 454/369 |
| 2011/0182036 | A1 | * | 7/2011 | Huang ............ H05K 7/20009 361/724 |

FOREIGN PATENT DOCUMENTS

| | | | | |
|---|---|---|---|---|
| EP | 2537563 | A1 | * 12/2012 | ............ F24F 13/029 |
| EP | 2772616 | A1 | 9/2014 | |
| EP | 2994620 | A1 | 3/2016 | |
| WO | 2014179821 | A1 | 11/2014 | |

* cited by examiner

VENTILATION PANEL WITH PANEL SILENCER FOR A TURBINE PACKAGE ENCLOSURE

TECHNICAL FIELD

The present disclosure generally pertains to a ventilation panel for a turbine package enclosure, and is directed toward a ventilation panel with a panel silencer for the turbine package enclosure.

BACKGROUND

Ventilation arrangements for enclosures of gas turbine engine packages can protrude significantly from one or more sides of the enclosure, which may significantly increase the footprint of the enclosures and may restrict access to the enclosure.

The present disclosure is directed toward overcoming one or more of the problems discovered by the inventors or that is known in the art.

SUMMARY OF THE DISCLOSURE

A ventilation panel for an enclosure of an industrial machine is disclosed. In one aspect of the invention the ventilation panel includes a panel silencer and a fire damper assembly. The panel silencer includes a back panel, a front panel, side panels, a top panel, a bottom panel, a front panel opening, and a plurality of exterior louvers. The front panel is opposite the back panel. The side panels extend between the back panel and the front panel. The top panel extends between the back panel and the front panel and is adjacent to each of the side panels. The bottom panel is opposite the top panel extending between the back panel and the front panel, and is adjacent to each of the side panels. The back panel, the top panel, the side panels, and the bottom panel form an internal cavity. The front panel opening is located in the front panel. The plurality of exterior louvers is located in the back panel. The fire damper assembly includes an outer duct and an isolation damper assembly. The outer duct is partially inserted into the panel silencer through the front panel opening and is affixed to the panel silencer. The isolation damper assembly includes an inner duct, a plurality of isolation louvers, and an actuation assembly. The inner duct is inserted into the outer duct and is affixed to the outer duct. The plurality of isolation louvers is rotatably affixed to the inner duct forming interior openings there between. The actuation assembly is coupled to the plurality of isolation louvers and rotates the plurality of isolation louvers into a closed position when activated.

DETAILED DESCRIPTION

The systems and methods disclosed herein include a ventilation panel for an enclosure of an industrial machine, such as a gas turbine engine. In embodiments, the ventilation panel includes a low profile panel silencer with a fire damper assembly that may be partially inserted into the panel silencer, which may significantly reduce the overall profile of the enclosure. This modular design of the ventilation panel may allow the ventilation panel to be easily repaired or modified. The fire damper assembly may include isolation louvers that can be actuated closed in the case of an emergency and that may be easily reset into an open position once the emergency has been averted.

Figure 1:
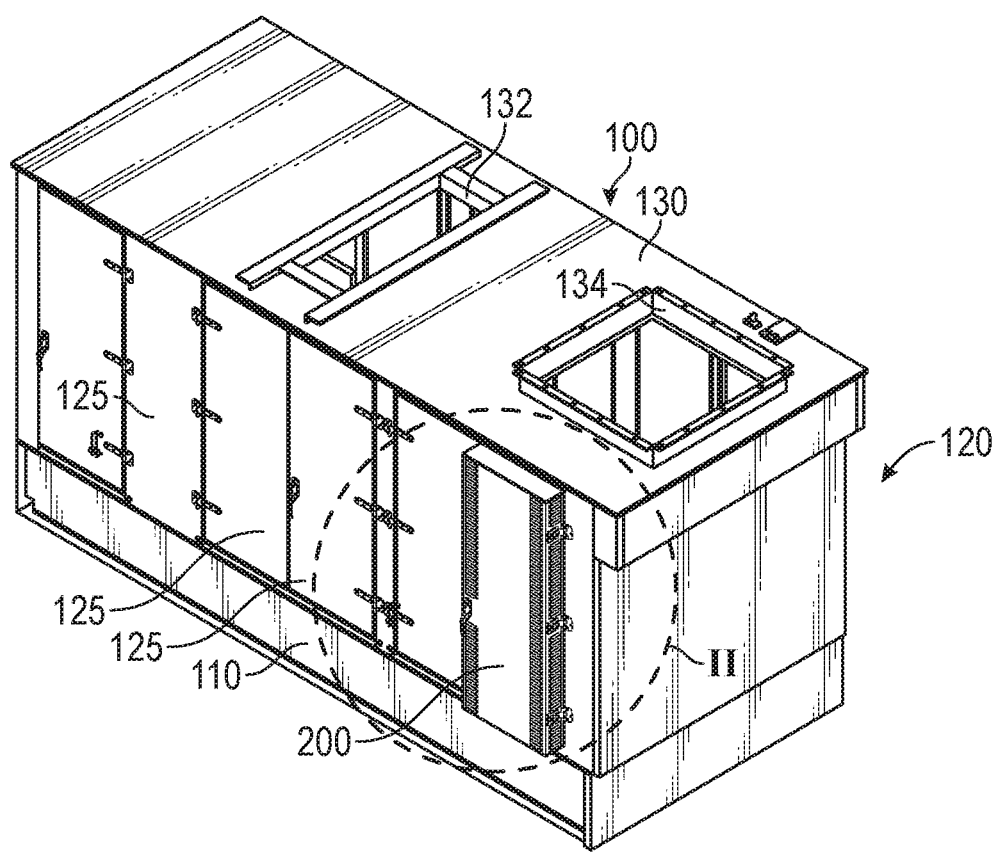
FIG. 1 is a perspective view of an exemplary embodiment of an enclosure for a gas turbine engine package.

FIG. 1 is a perspective view of an exemplary embodiment of an enclosure 100 for a gas turbine engine package. The enclosure 100 may include an enclosure platform 110, enclosure walls 120, enclosure roof 130, and ventilation panels 200. The enclosure platform 110 may support the gas turbine engine package including the gas turbine engine and any driven equipment connected to the gas turbine engine, such as a generator or gas compressor. The enclosure platform 110 may include a lubricant tank for the gas turbine engine.

The enclosure walls 120 extend up from the enclosure platform 110 and may be formed of enclosure panels 125. The enclosure panels 125 may generally be solid sheets that are joined together. The enclosure roof 130 may be joined to the enclosure walls 120. The enclosure roof 130 may include an enclosure gas turbine engine inlet 132 and an enclosure gas turbine engine outlet 134. The enclosure gas turbine engine inlet 132 may be an opening in the enclosure roof 130 that facilitates the connection of inlet ducting to the inlet of the gas turbine engine. The enclosure gas turbine engine outlet 134 may be an opening in the enclosure roof 130 that facilitates the connection of exhaust ducting to the exhaust of the gas turbine engine.

Figure 2:
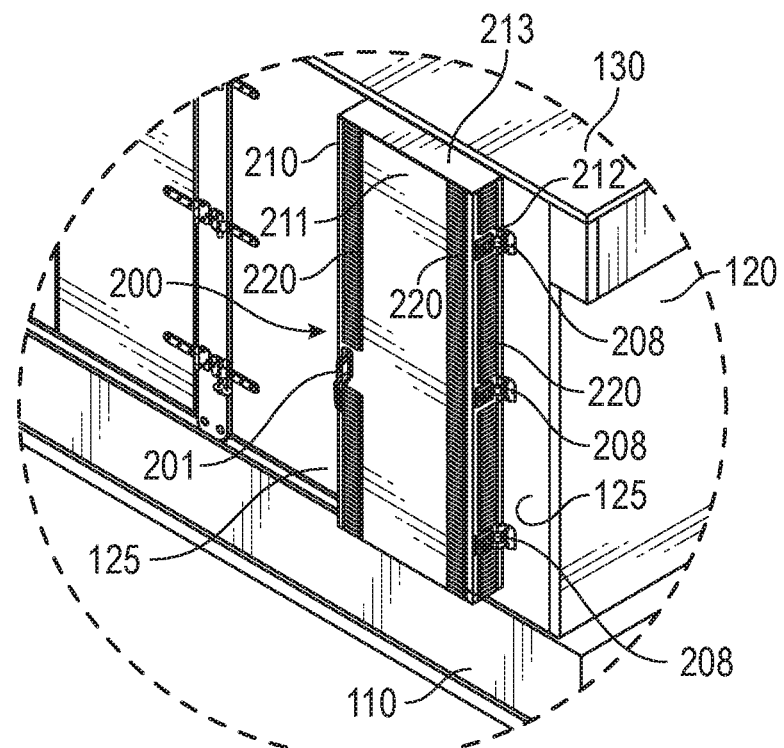
FIG. 2 is a detail view of a portion of the enclosure of FIG. 1 shown within circle II of FIG. 1.

FIG. 2 is a detail view of a portion of the enclosure 100 of FIG. 1 shown within circle II of FIG. 1. Referring to FIG. 2, the ventilation panel 200 may be joined to the enclosure walls 120. In the embodiment illustrated, the ventilation panel 200 is joined by hinges 208 on one side of the ventilation panel 200 and by a handle assembly 201 on the other side of the ventilation panel 200, which allows the ventilation panel 200 to function as an access point to the enclosure 100.

Figure 3:
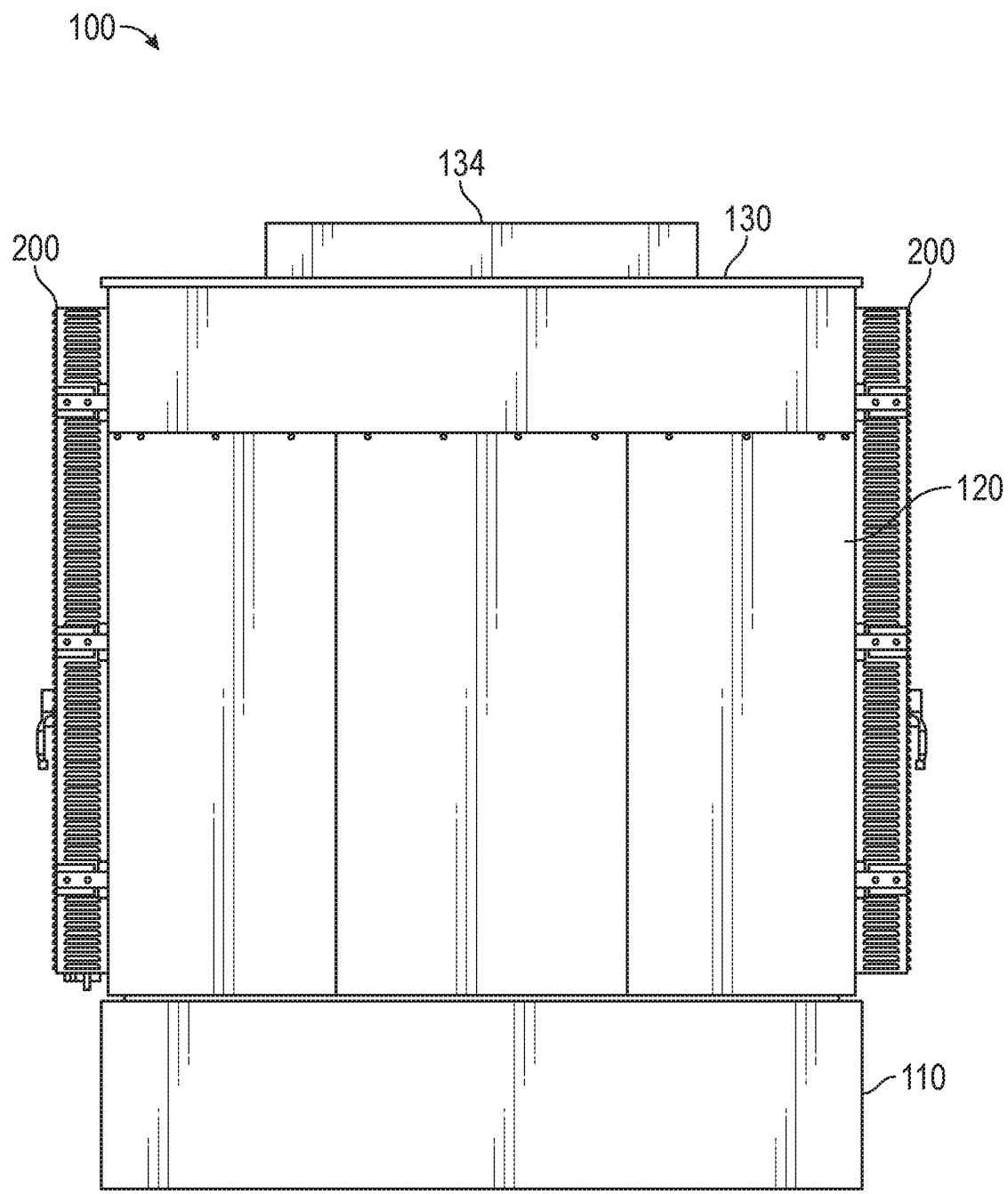
FIG. 3 is an end view of the enclosure of FIG. 1.

FIG. 3 is an end view of the enclosure 100 of FIG. 1. As illustrated in FIG. 3, the enclosure 100 may include multiple ventilation panels 200. In the embodiment illustrated, the enclosure 100 includes two ventilation panels 200 with one located on each side of the enclosure 100. Each ventilation panel 200 may function as an access point to the enclosure 100.

Figure 4:
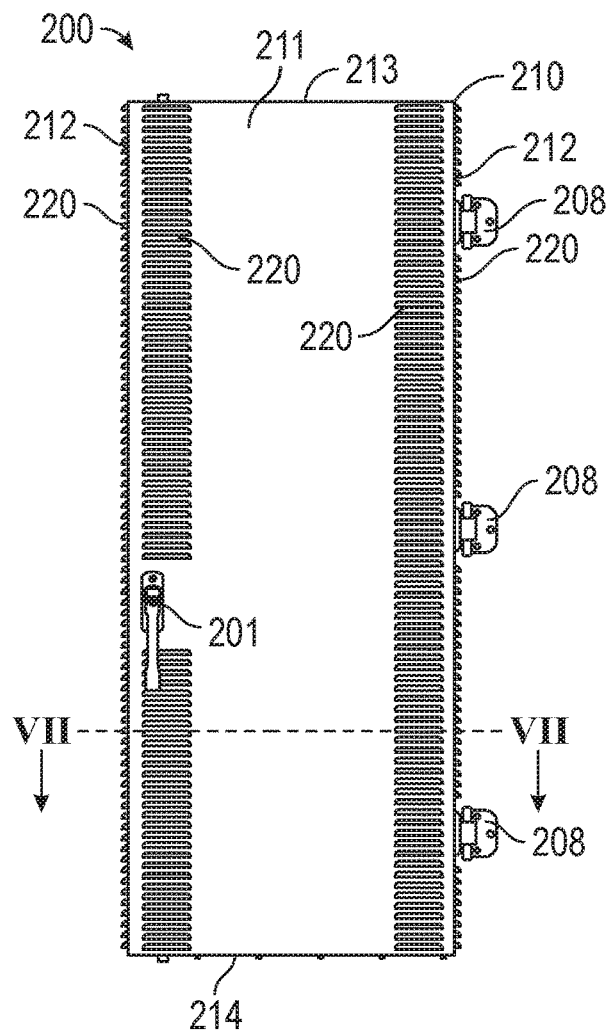
FIG. 4 is an exterior view of the ventilation panel of FIGS. 1-3.
Figure 5:
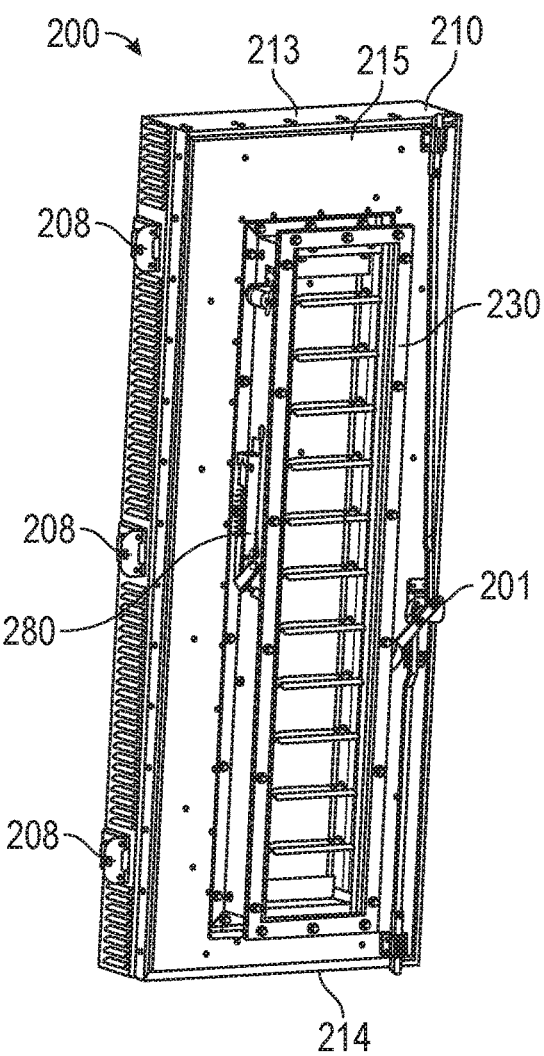
FIG. 5 is an interior perspective view of the ventilation panel of FIGS. 1-3.

FIG. 4 is an exterior view of the ventilation panel 200 of FIGS. 1-3. FIG. 5 is an interior perspective view of the ventilation panel 200 of FIGS. 1-3. Referring to FIGS. 4 and 5, the ventilation panel 200 may include a panel silencer 210 and a fire damper assembly 230. The panel silencer 210 may include a back panel 211, side panels 212, a front panel 215, a bottom panel 214, a top panel 213, and exterior louvers 220. The back panel 211, side panels 212, front panel 215, bottom panel 214, and top panel 213 may be joined together and may generally form a hollow cuboid shape and may enclose an internal cavity 225 (shown in FIG. 7).

The side panels 212, bottom panel 214 and top panel 213 may each extend between the back panel 211 and the front panel 215. The bottom panel 214 may be adjacent to each of the side panels 212 and the top panel 213 may be adjacent each of the side panels 212.

The exterior louvers 220 may be located in the back panel 211 and the side panels 212. The exterior louvers 220 may be arranged into vertical columns. In the embodiment illustrated, the side panels 212 each include a vertical column of exterior louvers 220 and the back panel 211 includes multiple vertical columns of exterior louvers 220. While the vertical columns of exterior louvers 220 in the back panel 211 are shown adjacent to the side panels 212 in the embodiment shown, they may also be situated in other areas of the back panel 211. As shown in FIG. 4, there may be a break in the vertical columns of exterior louvers 220 in locations where any connection hardware is attached to the panel silencer 210, such as the handle assembly 201 and the hinges 208.

The fire damper assembly 230 may be fastened to the panel silencer 210 adjacent to the front panel 215.

Figure 6:
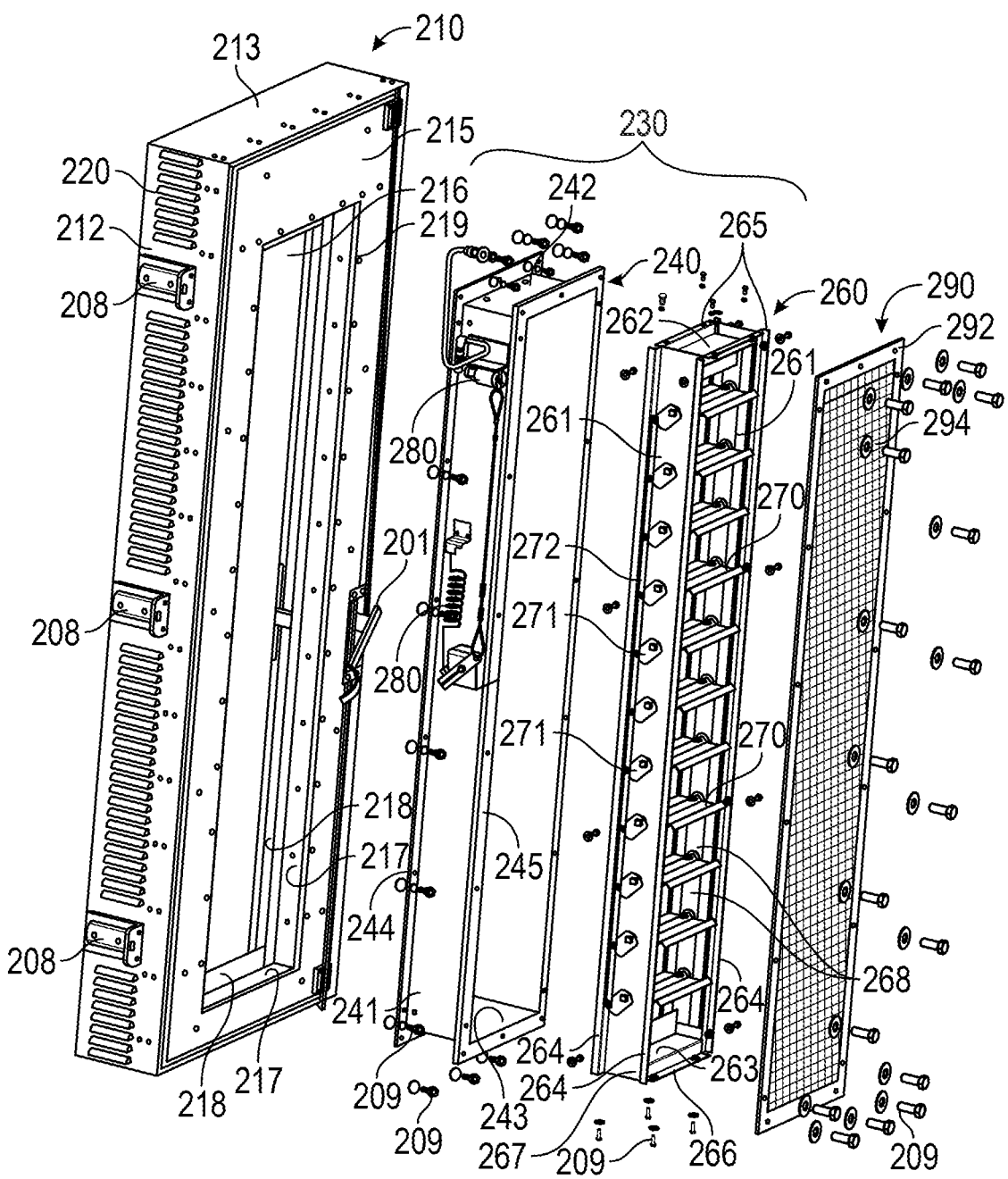
FIG. 6 is an exploded view of the ventilation panel of FIGS. 1-3.

FIG. 6 is an exploded view of the ventilation panel 200 of FIGS. 1-3. Referring to FIG. 6, a front panel opening 216, interior edges 219, interior panels 217, and interior flanges 218 can be seen. The front panel opening 216 may be an interior opening in the front panel 215. In the embodiment illustrated, the front panel opening 216 includes a rectangular shape. The front panel opening 216 may allow air to flow into or out of the internal cavity 225 of the panel silencer 210. The interior edges 219 may define the front panel opening 216 and may form the boundary of the front panel opening 216.

The interior panels 217 may extend from the interior edges 219 of the front panel 215 towards the back panel 211. The interior panels 217 may extend partially into the internal cavity 225, may form a rectangular tube shape and may each be perpendicular to the front panel 215. The interior flanges 218 may extend from the interior panels 217 in an inward direction and may protrude into the panel opening 216. The interior flanges 218 may be parallel to the front panel 215. The fire damper assembly 230 may be fastened to the panel silencer 210 at the interior flanges 218.

The fire damper assembly 230 may include an outer duct 240, an isolation damper assembly 260, and an actuation assembly 280. The outer duct 240 may have a rectangular tube shape, which may be formed by duct side panels 241, a duct top panel 242, and a duct bottom panel 243. The outer duct 240 may include a duct panel connection flange 244 at one end and a duct screen connection flange 245 at the opposite end, distal to the duct panel connection flange 244. The duct panel connection flange 244 and the duct screen connection flange 245 may each extend outward from the duct side panels 241, a duct top panel 242, and a duct bottom panel 243. The duct panel connection flange 244 and the duct screen connection flange 245 may each be perpendicular to the duct side panels 241, a duct top panel 242, and a duct bottom panel 243.

The outer duct 240 may be partially inserted into the front panel opening 216 within the interior panels 217. The duct panel connection flange 244 may be fastened to the interior flange 218 with fasteners 209 to secure the fire damper assembly 230 to the panel silencer 210. The connection between the duct panel connection flange 244 and the interior flange 218 may prevent air from flowing between the outer duct 240 and the interior panels 217.

The isolation damper assembly 260 may include an inner duct 267, isolation louvers 270, actuation arms 271, and an actuation connector 272. The inner duct 267 may have a rectangular tube shape, which may be formed by damper side panels 261, a damper top panel 262, and a damper bottom panel 263. The inner duct 267 may be sized to fit within the outer duct 240.

The inner duct 267 may include inner connection flanges that join the inner duct 267 to the outer duct 240. The inner connection flanges may act as standoffs to create a space between the outer duct 240 and the inner duct 267, and may block airflow there through. In the embodiment illustrated, the inner duct 267 includes damper side flanges 264, damper top flanges 265, and damper bottom flanges 266. Each of these flanges may include an 'L' shape. In the embodiment illustrated, the inner duct 267 includes a damper side flange 264 extending outward from each end of each damper side panel 261 toward a duct side panel 241, a damper top flange 265 extending outward from each end of the damper top panel 262 toward the duct top panel 242, and a damper bottom flange extending outward from each end of the damper bottom panel 263. The damper side flanges 264 may fasten to the duct side panels 241, the damper top flanges 265 may fasten to the duct top panel 242, and the damper bottom flanges 266 may fasten to the duct bottom panel 243.

The isolation louvers 270 may be located within the inner duct 267 and may be rotatably coupled to the inner duct 267, such as to the damper side panels 261. The isolation louvers 270 may be configurable in an open position and in a closed position. When the isolation louvers 270 are in an open position, the isolation damper assembly 260 may include interior openings 268 that may be formed within the inner duct 267 between adjacent isolation louvers 270.

Each actuation arm 271 may be connected to an isolation louver 270. The connection may be situated so that any rotation of the actuation arm 271 will cause the isolation louver 270 to rotate.

The actuation connector 272 may be an elongated member that is connected to each actuation arm 271. The linkage between the actuation connector 272 and each actuation arm 271 may allow relative rotation between the actuation connector 272 and each actuation arm 271 at the point of connection to facilitate any lateral translation of the actuation connector 272 resulting in rotational movement of the actuation arms 271.

The actuation assembly 280 may connect to the actuation connector 272 and may cause the actuation connector 272 to translate upon activation of the actuation assembly 280. The actuation assembly 280 may rotate the isolation louvers 270 from an open position to a closed position when the fire suppression system 300 (shown in FIG. 10) is activated, such as by translating the actuation connector 272 from a first position to a second position which rotates the actuation arms 271, causing the isolation louvers 270 to rotate into the closed position.

The ventilation panel 200 may also include a debris screen 290. The debris screen 290 may include a flange portion 292 and a screen portion 294. The flange portion 292 may border the screen portion 294 and may be secured to the duct screen connection flange 245. The screen portion 294 may act to prevent debris from passing into or out of the ventilation panel 200 through the interior openings 268 formed within the inner duct 267 between the isolation louvers 270.

The various components for the ventilation panel 200 including the panel silencer 210, the outer duct 240, the inner duct 267, the isolation damper assembly 260, and the debris screen 290 may be affixed together with fasteners 209, which may facilitate quick assembly and disassembly of the ventilation panel 200.

Figure 7:
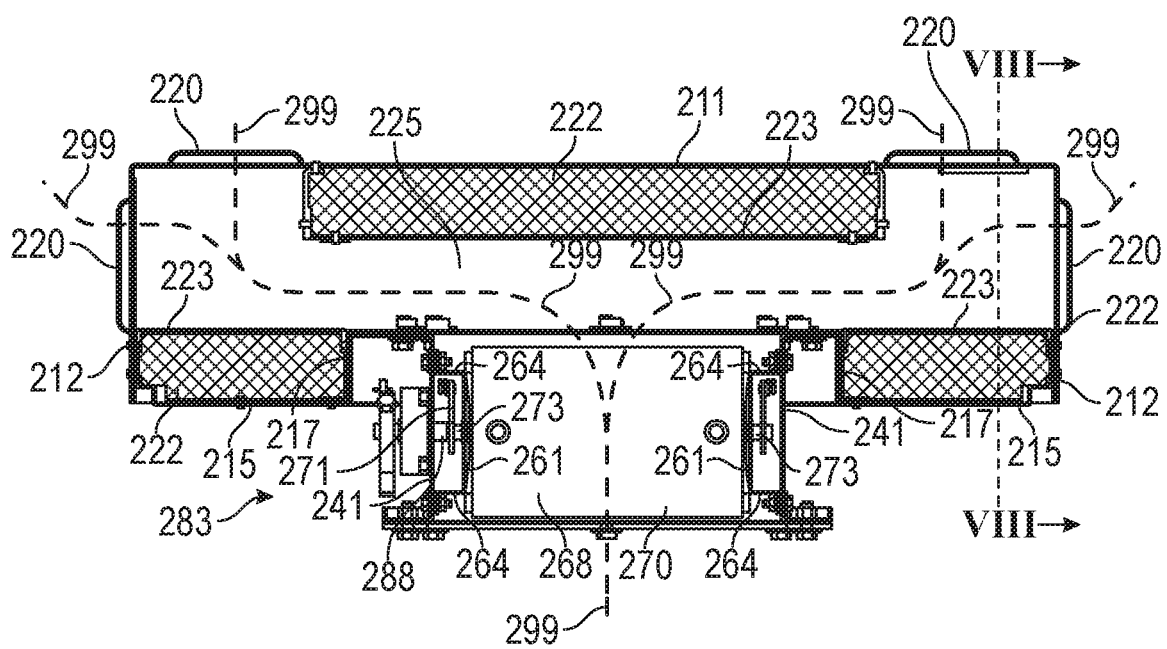
FIG. 7 is a cross-sectional view of the ventilation panel of FIGS. 1-3 taken along the line VII-VII in FIG. 4.

FIG. 7 is a cross-sectional view of the ventilation panel of FIGS. 1-3 taken along the line VII-VII in FIG. 4. Referring to FIG. 7, the isolation louver 270 may include a louver shaft 273 protruding from each side of the isolation louver 270. This may be a single shaft extending there through or may be two shafts where each is connected, such as by metallurgical bonding or by fastening, to a side of the isolation louver 270. The louver shaft 273 may extend through the inner duct 267 and in particular, through the damper side panels 261, which may prevent translation of the isolation louvers 270 relative to the inner duct 267 while allowing rotation of the isolation louvers 270 relative to the inner duct 267.

The ventilation panel 200 may also include insulation 222. The insulation 222 may be located within the internal cavity 225 of the panel silencer 210. The insulation 222 may include a perforated casing 223 that secures the insulation 222 to the panel silencer 210. Some insulation 222 may adjoin the front panel 215 in the space between the interior panels 217 and the outer panels, such as the side panels 212, the top panel 213, and the bottom panel 214, spanning around the interior panels 217. Some insulation 222 may also adjoin the back panel 211 spanning vertically between the top panel 213 and the bottom panel 214 and situated between the vertical columns of exterior louvers 220 in the back panel 211.

Figure 8:
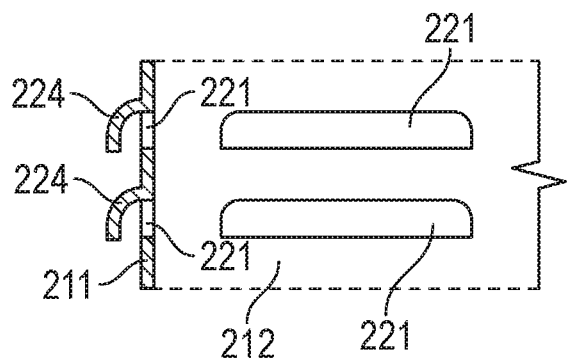
FIG. 8 is a partial view of the back panel 211 from inside the panel silencer 210 with the view area identified by line VIII-VIII in FIG. 7.

FIG. 8 is a partial cross-sectional view of the panel silencer 210 taken along line VIII-VIII in FIG. 7. Referring to 7, and 8, each exterior louver 220 may include a louver fin 224 and a louver opening 221. The louver fins 224 may prevent or reduce the amount of debris or moisture passing through the louver openings 221 and into the internal cavity 225. In the embodiment illustrated, the exterior louvers 220 are punched where portions of the back panel 211 and side panels 212 are punched out to form the louver fins 224 and the louver openings 221.

Figure 9:
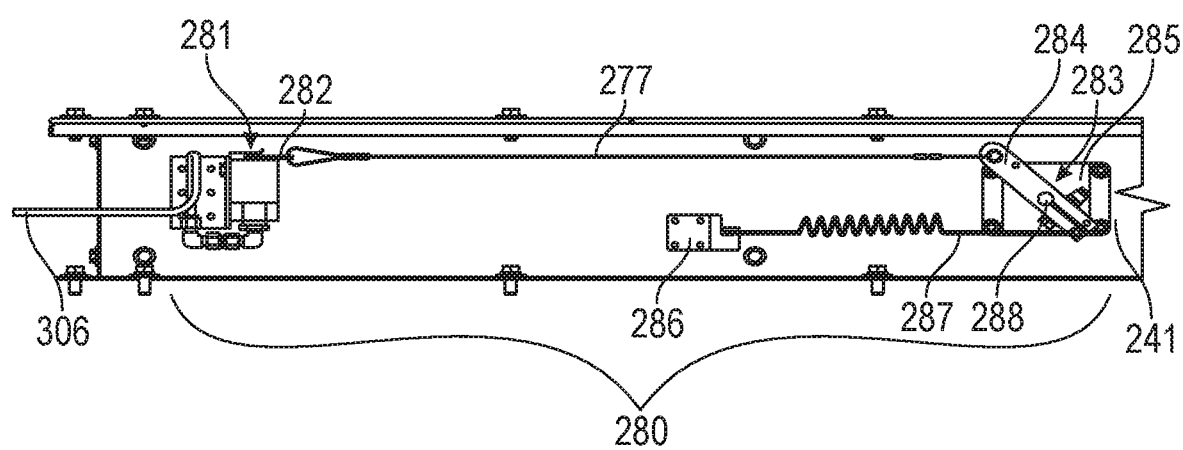
FIG. 9 is a detailed view of an embodiment of the actuation assembly of FIG. 6.

FIG. 9 is a detailed view of an embodiment of the actuation assembly 280 of FIG. 6. The actuation assembly 280 may be affixed to the outer duct 240, such as the duct side panel 241 as shown in FIG. 9. The actuation assembly 280 may include a spring mechanism 283, a release connector 277, and a release mechanism 281.

The spring mechanism 283 may include a spring 287, a spring connector 286, a mechanism body 285, a release shaft 288, and a spring arm 284. The spring 287 may be affixed to the spring connector 286 at one end and to the spring arm 284 at the other end. The spring connector 286 may be affixed to the duct side panel 241 to hold an end of the spring 287 in a fixed position.

The mechanism body 285 may also be affixed to the duct side panel 241 and may secure the spring arm 284 and the release shaft 288 in place.

The release shaft 288 may be the center of rotation of the spring arm 284. The release shaft 288 may be connected to the spring arm 284 at one end. Referring to FIG. 7, the release shaft 288 may be connected to a actuation arm 271 at the other end. The actuation arm 271 may be located between the outer duct 240 and the inner duct 267. The actuation arm 271 may be connected to the actuation connector 272 and is configured to transfer rotation of the release shaft 288 to the rotation of the actuation arm 271. In some embodiments, this actuation arm 271 may also be connected to a louver shaft 273.

The spring arm 284 may be connected to the release shaft 288 and may rotate the release shaft 288. The spring arm 284 may be connected to the spring 287 at one end and may be connected to the release connector 277 at the other end.

The release connector 277 may be connectable to the release mechanism 281. The release mechanism 281 may include a release arm 282. The release arm 282 may releasably connect to the release connector 277. The release connector 277 may be translated when connected to the release arm 282, which may cause the spring arm 284 to rotate into an open position. When the spring arm 284 is rotated into an open position, the spring 287 may be stretched into a loaded state.

The release mechanism 281 may be configured to release the release connector 277 when the fire suppression system 300 is activated. In the embodiment illustrated, the release mechanism 281 is fluidly connected to damper tubing 306 that is pressurized when the fire suppression system 300 is activated and the pressure in the damper tubing 306 triggers the release mechanism 281 to release the release connector 277. When the release connector 277 is released, the spring 287 may unload and cause the spring arm 284 to rotate into a closed position. The rotation of the spring arm 284 may rotate the actuation arm 271 resulting in the translation of the actuation connector 272. The translation of the actuation connector 272 may rotate the actuation arms 271 which causes the louver shafts 273 and the isolation louvers 270 to rotate into the closed position. The spring 287 may hold the various components in their closed positions until the system is reset and the release connector 277 is reattached to the release arm 282.

Figure 10:
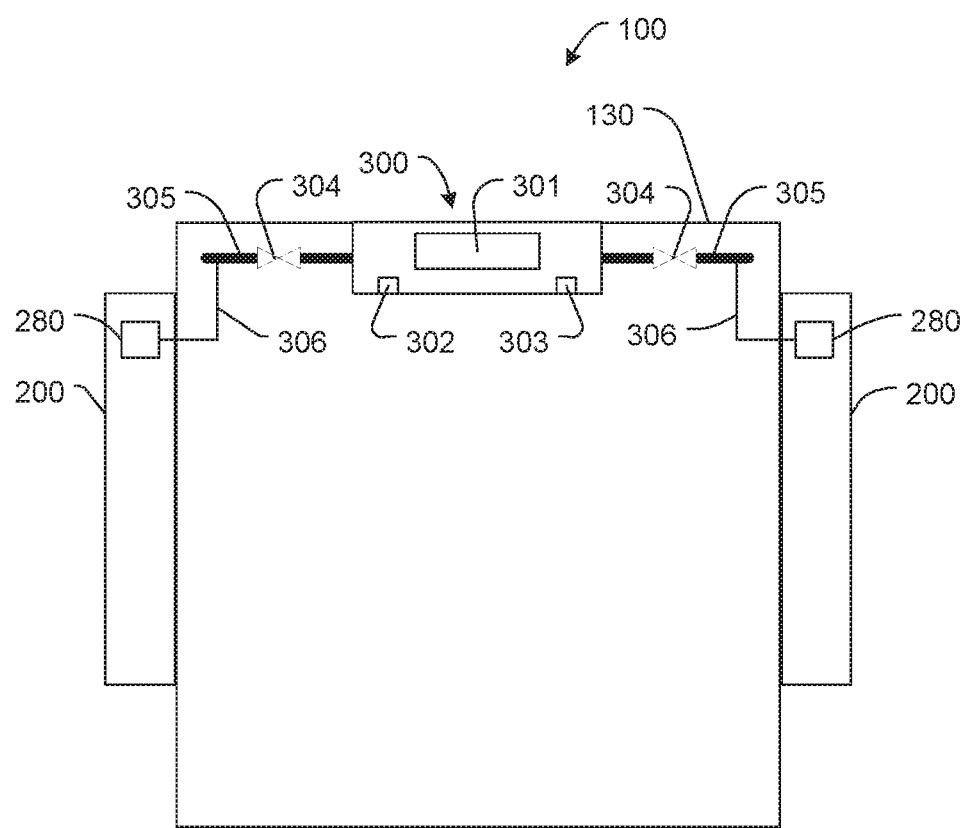
FIG. 10 is a schematic illustration of a fire suppression system for the enclosure of FIG. 1.

FIG. 10 is a schematic illustration of a fire suppression system 300 for the enclosure 100 of FIG. 1. The fire suppression system 300 may include a suppressant storage 301, suppressant tubing 305, actuated valves 304, a fire detector 302, a gas detector 303, and damper tubing 306. The suppressant storage 301 may store a pressurized suppressant fluid, such as carbon dioxide. The suppressant tubing 305 may extend from the suppressant storage 301 adjacent to the enclosure roof 130 and may disperse the suppressant fluid.

The actuated valves 304 may control the release of the suppressant fluid from the suppressant storage 301 into the suppressant tubing 305. The fire detector 302 and the gas detector 303 may be located within the enclosure 100 and may provide a signal to the fire suppression system 300 when fire or gas is detected. When a detection signal is detected, the fire suppression system 300 may actuate the actuated valves 304 to release the suppressant fluid into the suppressant tubing 305 for dispersion, which may pressurize the suppressant tubing 305 and the damper tubing 306. The pressure in the damper tubing 306 may trigger the actuation assembly 280 as the suppressant fluid begins to disperse.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries. These applications are often in locations that are ill suited for machinery operations due to the surrounding environments and the space available for the machinery. Enclosures for gas turbine engines may protect the gas turbine engine packages from the environment and may also act as a safety mechanism for the gas turbine engine packages.

Gas turbine engine operators may need to access the gas turbine engine package, which requires access to and ventilation of the enclosure. Traditional ducting for the enclosures may utilize a significant amount of space, may restrict access to the package and around the package, and may require an external support.

The ventilation panel 200 as disclosed herein may replace the traditional ducting, which may result in an enclosure 100 with a significantly reduced footprint. The enclosure 100 with the ventilation panel 200 may permit an operator to walk around the exterior of the enclosure 100 without obstruction from the ducting and external supports for that ducting.

The ventilation panel 200 may also include hinges 208 and a handle assembly 201 that affix the ventilation panel 200 to the enclosure 100 and allow the ventilation panel 200 to act as an access point into the enclosure 100, which may improve access to the enclosure 100. Some embodiments of the enclosure 100 may include multiple ventilation panels 200, which may further improve access to the enclosure 100 and may increase ventilation to the enclosure 100 without obstructing the exterior of the enclosure 100.

Referring to FIG. 6, the modular construction of the ventilation panel 200, such as the separate panel silencer 210 and the various separable components of the fire damper assembly 230 may allow the ventilation panel 200 to be easily serviced, repaired, or upgraded.

Referring to FIG. 7, the air may ventilate and flow through the ventilation panel 200 in either direction. The airflow path 299, illustrated as dashed lines may enter or exit the ventilation panel 200 through the exterior louvers 220 and may enter or exit the ventilation panel 200 through the interior openings 268 between the isolation louvers 270.

In the case of an emergency where fire or a gas leak is detected within the enclosure 100, the isolation louvers 270 may be closed by the actuation assembly 280 to cut off ventilation into the enclosure 100. Referring to FIG. 9, once the emergency is over, the ventilation through the ventilation panel 200 can easily be reestablished by reconnecting the release connector 277 to the release mechanism 281.

The preceding detailed description is merely exemplary in nature and is not intended to limit the invention or the application and uses of the invention. The described embodiments are not limited to use in conjunction with a particular type of enclosure. Hence, although the present disclosure, for convenience of explanation, depicts and describes particular embodiments of the ventilation panel, it will be appreciated that the ventilation panel in accordance with this disclosure can be implemented in various other configurations, can be used with various other types of enclosures, and can be used in conjunction with other types of industrial machines. Any explanation in connection with one embodiment applies to similar features of other embodiments, and elements of multiple embodiments can be combined to form other embodiments. Furthermore, there is no intention to be bound by any theory presented in the preceding background or detailed description. It is also understood that the illustrations may include exaggerated dimensions to better illustrate the referenced items shown, and are not considered limiting unless expressly stated as such.

What is claimed is:

1. A ventilation panel for an enclosure of an industrial machine, the ventilation panel comprising:
   a panel silencer including
      a back panel,
      a front panel opposite the back panel,
      side panels extending between the back panel and the front panel,
      a top panel extending between the back panel and the front panel and adjacent to each of the side panels,
      a bottom panel opposite the top panel, extending between the back panel and the front panel, and adjacent to each of the side panels, the back panel, the top panel, the side panels, and the bottom panel forming an internal cavity,
      a front panel opening located in the front panel,
      interior panels extending toward the back panel from interior edges of the front panel located at the front panel opening, and
      a plurality of exterior louvers located in at least one of the side panels; and
   a fire damper assembly including
      an outer duct partially inserted into the panel silencer through the front panel opening and affixed to the panel silencer,
      an isolation damper assembly including
         an inner duct inserted into the outer duct and affixed to the outer duct,
         a plurality of isolation louvers rotatably affixed to the inner duct forming interior openings there between, and
         an actuation assembly coupled to the plurality of isolation louvers and configured to rotate the plurality of isolation louvers into a closed position when activated.

2. The ventilation panel of claim 1, further comprising a second plurality of exterior louvers located in the back panel.

3. The ventilation panel of claim 2, wherein the plurality of exterior louvers is arranged in a column in at least one of the side panels and the second plurality of exterior louvers is arranged in at least one column in the back panel.

4. The ventilation panel of claim 1, wherein the ventilation panel includes hinges and a handle assembly.

5. The ventilation panel of claim 1, further comprising a debris screen, wherein the outer duct includes a duct screen connection flange, and wherein the debris screen is affixed to the duct screen connection flange.

6. The ventilation panel of claim 1, wherein the actuation assembly includes a release mechanism, a release connector connectable to the release mechanism, a release shaft, a spring arm connected to the release connector and the release shaft, and a spring connected to the spring arm that is loaded when the release connector is releasably connected to the release mechanism, where the spring unloads when the release mechanism releases the release connector and the spring rotates the spring arm and the release shaft which causes the plurality of isolation louvers to rotate into the closed position.

7. The ventilation panel of claim 1, further comprising insulation located within the internal cavity.

8. A ventilation panel for an enclosure of an industrial machine, the ventilation panel comprising:
a panel silencer including
a back panel,
a front panel opposite the back panel,
side panels extending between the back panel and the front panel,
a top panel extending between the back panel and the front panel and adjacent to each of the side panels,
a bottom panel opposite the top panel, extending between the back panel and the front panel, and adjacent to each of the side panels, the back panel, the top panel, the side panels, and the bottom panel forming an internal cavity,
a front panel opening located in the front panel,
interior panels extending toward the back panel from interior edges of the front panel located at the front panel opening,
interior flanges extending inward from the interior panels, and
a plurality of exterior louvers located in the side panels; and
a fire damper assembly including
an outer duct partially inserted into the panel silencer through the front panel opening, the outer duct including a duct panel connection flange that is affixed to the interior flanges,
an isolation damper assembly including
an inner duct inserted into the outer duct, the inner duct including inner connection flanges that connect the inner duct to the outer duct,
a plurality of isolation louvers rotatably affixed to the inner duct forming interior openings there between, each of the plurality of isolation louvers including a louver shaft protruding from each side and extending through damper side panels of the inner duct,
a plurality of actuation arms, each affixed to the louver shaft of one of the plurality of isolation louvers,
an actuation connector affixed to each of the plurality of actuation arms, the actuation connector causing the plurality of isolation louvers to rotate when translated, and
an actuation assembly that connects to the actuation connector and causes the actuation connector to translate upon activation of the actuation assembly.

9. The ventilation panel of claim 8, further comprising a second plurality of exterior louvers located in the back panel.

10. The ventilation panel of claim 9, wherein the plurality of exterior louvers is arranged in a column in each of the side panels and the second plurality of exterior louvers is arranged in at least one column in the back panel.

11. The ventilation panel of claim 8, wherein the ventilation panel includes hinges and a handle assembly that are configured to affix the ventilation panel to an enclosure.

12. The ventilation panel of claim 8, further comprising a debris screen including a flange portion and a screen portion within the flange portion, wherein the outer duct includes a duct screen connection flange opposite the duct panel connection flange, and wherein the flange portion is affixed to the duct screen connection flange.

13. The ventilation panel of claim 8, wherein the actuation assembly includes a release mechanism, a release connector connectable to the release mechanism, a release shaft, a spring arm connected to the release connector and the release shaft, a spring connected to the spring arm that is loaded when the release connector is releasably connected to the release mechanism, and one of the plurality of actuation arms is connected to the release shaft, where the spring unloads when the release mechanism releases the release connector and the spring rotates the spring arm, the release shaft, and the actuation arm causing the actuation connector to translate, resulting in the rotation of the plurality of the actuation arms that cause the plurality of isolation louvers to rotate into a closed position.

14. The ventilation panel of claim 8, further comprising insulation within the internal cavity adjoining the front panel between the side panels and the interior panels.

15. An enclosure for an industrial machine, the enclosure comprising:
an enclosure platform;
enclosure walls extending up from the enclosure platform, the enclosure walls including enclosure panels joined together;
an enclosure roof joined to the enclosure walls; and
a ventilation panel affixed to the enclosure walls, the ventilation panel including
a panel silencer including
a back panel,
a front panel opposite the back panel,
side panels extending between the back panel and the front panel,
a top panel extending between the back panel and the front panel and adjacent to each of the side panels,
a bottom panel opposite the top panel, extending between the back panel and the front panel, and adjacent to each of the side panels, the back panel, the top panel, the side panels, and the bottom panel forming an internal cavity,
a front panel opening located in the front panel,
interior panels extending toward the back panel from interior edges of the front panel located at the front panel opening, and
a plurality of exterior louvers located in at least one of the side panels; and
hinges affixed to one of the side panels and to one of the enclosure panels;
a handle assembly used for opening and closing the ventilation panel as an access point to the enclosure;
a fire damper assembly including
an outer duct partially inserted into the panel silencer through the front panel opening and affixed to the panel silencer,
an isolation damper assembly including
an inner duct inserted into the outer duct and affixed to the outer duct,
a plurality of isolation louvers rotatably affixed to the inner duct forming interior openings there between, and
an actuation assembly coupled to the plurality of isolation louvers and configured to rotate the plurality of isolation louvers into a closed position when activated.

16. The enclosure of claim 15, further comprising a second ventilation panel affixed to one of the enclosure panels by second hinges.

17. The enclosure of claim 15, further comprising a fire suppression system that releases a pressurized suppressant fluid when a fire or gas is detected, and wherein the release of the pressurized suppressant fluid activates the actuation assembly.

18. The enclosure of claim 15, wherein the actuation assembly includes a release mechanism, a release connector connectable to the release mechanism, a release shaft, a spring arm connected to the release connector and the release shaft, and a spring connected to the spring arm that is loaded when the release connector is releasably connected to the release mechanism, where the spring unloads when the release mechanism releases the release connector and the spring rotates the spring arm and the release shaft which causes the plurality of isolation louvers to rotate into a closed position.

19. The enclosure of claim 15, wherein the ventilation panel includes insulation located within the internal cavity.

20. The enclosure of claim 15, wherein the ventilation panel includes a debris screen, wherein the outer duct includes a duct screen connection flange, and wherein the debris screen is affixed to the duct screen connection flange.

\* \* \* \* \*